March 3, 1959 N. I. KORMAN ET AL 2,876,446
RADAR SYSTEM HAVING ANTENNA ROTATION AND TRANSMITTER
KEYING PRECISELY SYNCHRONIZED
Filed March 29, 1954 2 Sheets-Sheet 1

INVENTORS
Nathaniel I. Korman
& William V. Goodwin
BY
ATTORNEY

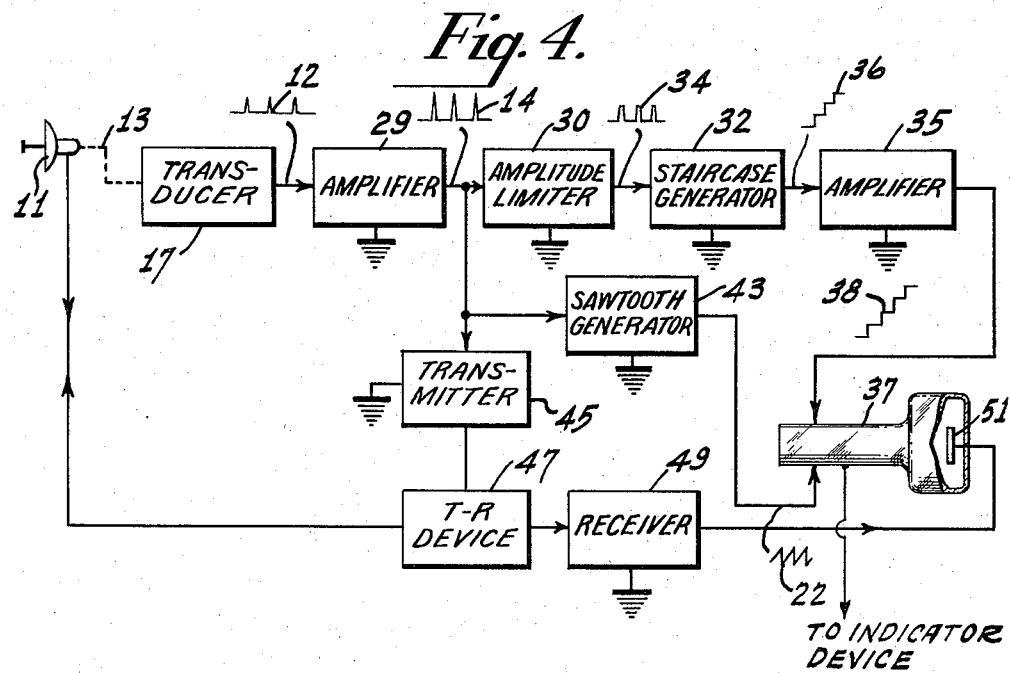

United States Patent Office 2,876,446
Patented Mar. 3, 1959

2,876,446

RADAR SYSTEM HAVING ANTENNA ROTATION AND TRANSMITTER KEYING PRECISELY SYNCHRONIZED

Nathaniel I. Korman, Rancocas, and William V. Goodwin, Haddonfield, N. J., assignors to Radio Corporation of America, a corporation of Delaware Application March 29, 1954, Serial No. 419,446

4 Claims. (Cl. 343—7.7)

This invention relates generally to radar systems and more particularly to an improved moving target indication radar system employing an electrical signal storage tube, including means for operating the system at higher scan rates than heretofore possible without degrading system performance.

Heretofore, most moving target indication radar systems employing line-by-line cancellation of stationary radar targets have been susceptible to "scanning modulation." This type of modulation also has been troublesome in area moving target indication radar systems where the "lines" of radar data are compressed and overlap to increase the amount of information which may be stored in an electrical storage tube. The scanning modulation primarily results from the fact that on successive 360° or successive sector scans of the radar antenna, the pulsed radar beam is not radiated into space in precisely the same directions.

An object of the present invention is to provide an improved radar system which is not susceptible to "scanning modulation."

Another object of the invention is to provide an improved radar system in which movement of the radar antenna and the keying of the radar transmitter output are precisely synchronized.

Another object of the invention is to provide an improved radar system in which movement of the radar antenna, keying of the radar transmitter, and generation of deflection waves for a cathode ray device are precisely synchronized.

Another object of the invention is to provide a novel electromechanical transducer for use in precisely synchronizing the pulse output of a radar transmitter with the rotation of its associated radar antenna.

Another object of the invention is to provide an improved radar system capable of operating at higher scan rates than heretofore possible without degrading system performance.

A further object of the invention is to provide an improved radar system capable of operating at a higher scan rate and/or lower pulse repetition frequency without degradation of sub-clutter visibility which degradation, under such circumstances, normally is due to increased scanning modulation.

A further object of the invention is to provide an improved radar system which affords greater discrimination against slowly moving clutter indications than heretofore possible.

A still further object of the invention is to provide a radar system of the type referred to above in which the scan rate of the radar antenna is variable within the limits of the transmitter duty cycle without upsetting the stored charge equilibrium in the electrical storage tube and without making any compensating adjustments in the storage circuitry for such scan rate variation.

According to the present invention, a radar system is disclosed and claimed employing a transducer which is precisely synchronized with the rotation of the antenna pedestal. The output of the transducer triggers or keys the radar transmitter so that radar pulses transmitted by the radar are transmitted in precisely the same directions during successive radar scans. Radar echo signals thus may be stored on the storage member of a cathode ray device such as an electrical storage tube at positions which are precisely the same for a given direction and range of a radar wave reflecting object. The deflection circuitry for the storage tube also is synchronized with the antenna rotation and transmitter keying.

Since the keying of the radar transmitter and the rotation of the antenna pedestal are precisely synchronized, scanning modulation is reduced considerably and fewer pulses per azimuth scan may be generated and utilized without reducing or degrading the sub-clutter visibility. Furthermore, with higher scan rates possible, slowly moving clutter is sampled at a higher rate and less scan-to-scan change for such clutter is introduced into the system.

The invention will be described in greater detail with reference to the accompanying drawing in which:

Figure 4 is a schematic diagram, also in block form, of a second embodiment of the invention.

Like reference numerals are applied to like elements throughout the drawing.

Figure 1:
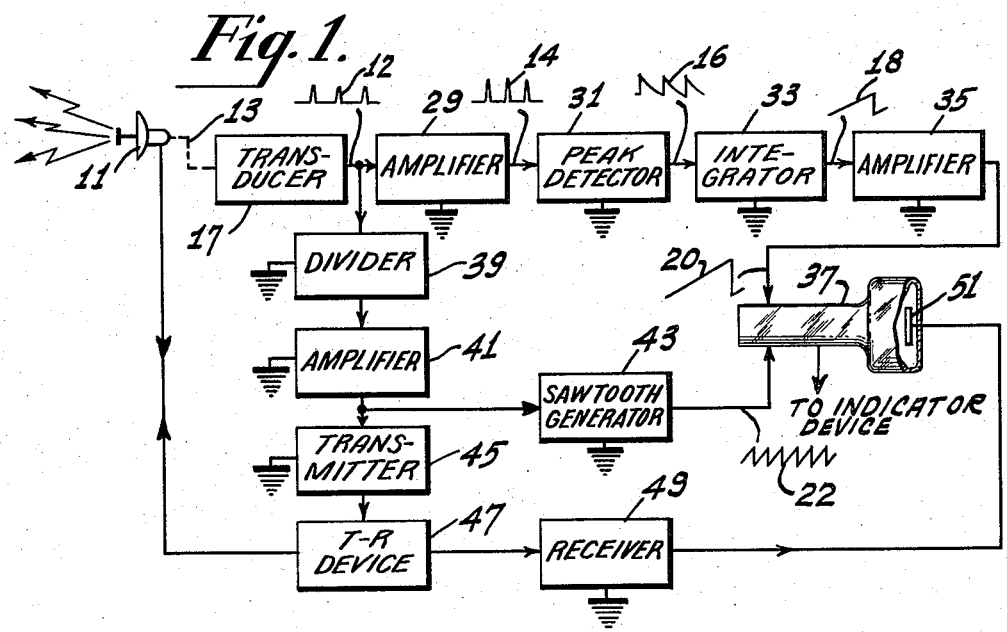
Figure 1 is a schematic block diagram of a first embodiment of a moving target indication radar system, according to the invention, in which the radar antenna pedestal and pulse transmitter are precisely synchronized and in which the transducer produces pulses at a rate greater than the system pulse repetition rate for purposes of improving the system performance.

Referring to Figure 1, a directional radar antenna 11 is rotatable in an azimuth plane. The antenna may be rotated to search through a complete 360° scan or may be rotated to sector scan, as desired. Such rotation of the antenna may be produced by means of an antenna drive motor (not shown) which is coupled to the antenna shaft 13. The antenna shaft 13 is mechanically coupled to the shaft 15 of an electromechanical transducer 17. The details of a typical embodiment of a transducer suitable for operation in the present system are shown in Figures 2 and 3.

Figure 2:
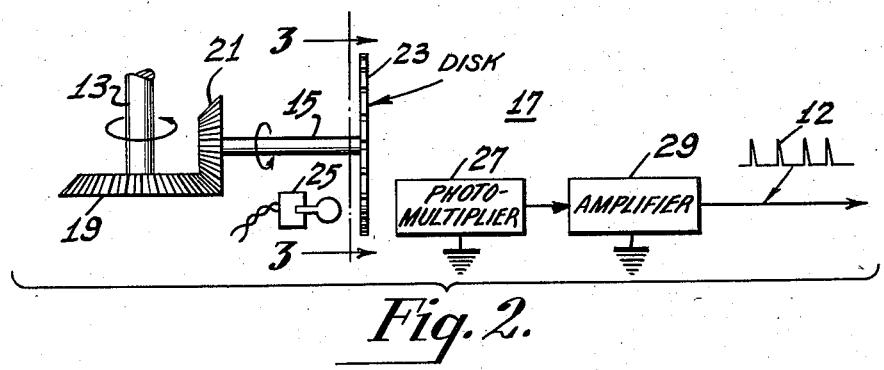
Figure 2 is a partially schematic view which shows an electromechanical transducer for use in the radar system of Figure 1.
Figure 3:
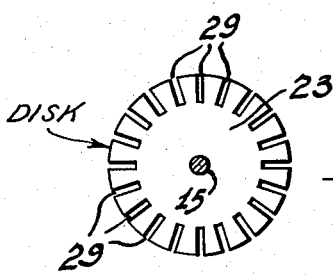
Figure 3 is a sectional view of a portion of the structure of Figure 2 taken along the section line 3—3.

Referring to Figures 2 and 3, the antenna shaft 13 has a gear 19 coaxially connected to one of its ends. Gear 19 meshes and cooperates with a second gear 21 coaxially connected to one end of the transducer shaft 15, so that rotation of the antenna shaft 13 causes proportional rotation of the transducer shaft 15. A disk 23, having radial slots equi-spaced around its periphery, is connected to the other end of the shaft 15. The disk 23 is positioned between a collimated light source 25 and a photoelectric device such as a photomultiplier 27.

In operation, rotation of the antenna 11 at some controlled angular velocity results in rotation of the disk 23 at a proportional angular velocity. Thus the slotted disk 23 interrupts the collimated light from the source 25 and short pulses of light impinge on the photoemissive cathode of the photomultiplier 27. When the rate of antenna rotation is low, the output from the photomultiplier 27 is a series of time-spaced pulses 12 having substantially constant amplitude and occurring at a rather low repetition rate. When the antenna rotational rate is substantially higher, the photomultiplier output pulses have a higher pulse repetition rate. However, in both instances the timing of each photomultiplier pulse is precisely synchronized with and slaved to the instantaneous azimuth position of the antenna 11.

Referring again to Figure 1, the time-spaced pulse output 12 of the transducer 17 simultaneously is applied to two signal channels. In one channel the pulses are applied to an amplifier 29 to produce amplified pulses 14 which in turn are applied to a peak detector 31. The peak detector output 16 is then integrated in an RC type integrating circuit 33 to provide a linear sawtooth type wave 18 which may be further amplified, if desired, in another amplifier stage 35. The output wave 20 of the amplifier 35 then may be applied to one pair of deflection plates of a barrier-grid electrical storage tube 37. The structure of this type of storage tube is described in Pat. No. 2,598,919 granted to Arthur S. Jensen on June 3, 1952.

In the other signal channel, the time-spaced transducer pulses 12 are divided in a pulse rate divider circuit 39 and amplified in an amplifier 41. Preferably the divider circuit division ratio is of the order of ten. The output of the amplifier 41 is applied to a sawtooth generator 43 which provides the range deflection wave 22 for the storage tube 37. The range deflection wave is applied to the remaining pair of storage tube deflection plates. The amplifier output also is utilized to key the radar transmitter 45. The high power pulse output of the transmitter 45 is coupled via a transmit-receive device 47, i. e., a microwave duplexer, to the directional antenna 11 which directionally radiates high power pulses of energy into space.

After reflection by remote wave reflecting objects the microwave radar echo signals are coupled from the antenna 11 to a radar receiver 49 via the transmit-receive device 47. In the receiver 49 the reflected echo pulses are demodulated and amplified to produce video pulses at the receiver output. The video pulses are then applied to the signal plate 51 of the storage tube 37 wherein the data are stored. The operation of the tube 37 in a moving target indication radar system such as the instant system is such that if the position of a specific radar target has not changed in the interval between successive azimuth searches, there is no output from the storage tube. However, if the position of the target has changed, an output proportional thereto is produced which may be coupled to a suitable indicating device such as a kinescope. The method of storage tube operation is described in Pat. Nos. 2,548,405 and 2,563,488 granted to R. L. Snyder, Jr. and A. Rose, respectively, on April 10, 1951 and August 7, 1951.

The function of the divider 39 in the one signal channel which controls the pulse repetition rate of the transmitter 45 is to permit integration in the other signal channel at a substantially higher pulse rate. Thus, in the example given, integration at a rate of ten to one over the pulse repetition rate provides smooth integration for azimuth sweep generation.

Referring to Figure 4, a second embodiment of the invention utilizes a staircase-shaped azimuth deflection wave 36 rather than the linear sawtooth integrated deflection wave 18 of Figure 1. In said second embodiment, the keying of the radar transmitter 45 is accomplished in the manner heretofore discussed with reference to Figure 1, except that each of the pulses 12 produced by the transducer 17 keys the transmitter 45. No pulse rate divider is required and each amplified transducer pulse actuates the range deflection sawtooth generator 43. The circuitry 47, 49 for receiving the reflected transmitted energy and the storage tube 37 operates as described previously.

In the azimuth deflection wave generating channel, however, each of the output pulses 14 derived from the amplifier 29 is limited in an amplitude limiter 30. The pulse train output 34 of the limiter 30 is then applied to a staircase generator 32 which produces a staircase or step-shaped wave 36. The staircase wave may be amplified, if desired, in an amplifier 35 and the output thereof 38 applied to the pair of storage tube deflection plates providing azimuth deflection. A staircase generator suitable for operation in the present system is described at pages 603-604 of volume 19 of the MIT Radiation Laboratory Series.

In both embodiments of the invention, the generation of keying pulses for the radar transmitter is precisely synchronized in time with rotation of the radar antenna. The azimuth and range deflection wave generating circuitry also is precisely synchronized with the antenna rotation and transmitter keying. The radar pulses thus are transmitted into space in precisely the same directions during successive radar scans and radar echo signals are stored in a storage tube at positions which are precisely the same for a given direction and range of a radar wave reflecting object. The scan rate of the instant system readily is variable within the limits of the transmitter duty cycle. Such variation in scan rate may be achieved, for example, by utilizing disks coupled to the antenna shaft having different numbers of slots about their peripheries or by changing the gear ratio between the antenna and transducer shafts, or by other means when a different type of transducer is employed in accordance with the invention.

What is claimed is:

1. A moving target indication radar system comprising, a rotatable directional radar antenna, a radar transmitter, a transducer coupled between said antenna and said transmitter for producing time-spaced keying pulses for said transmitter which are precisely synchronized in time with the instantaneous position and rate of rotation of said antenna, a receiver for receiving radar transmitter energy after radiation from said antenna and reflection by remote wave reflecting objects, a barrier-grid electrical storage tube having an input circuit coupled to the output of said receiver for accepting received reflected radar transmitter energy, azimuth and range deflection wave generating circuits coupled to said transducer for supplying deflection wave signals to said barrier-grid tube, said range deflection wave generating circuit including a sawtooth wave deflection circuit responsive to each transducer output pulse coupled between said cathode ray device and said transducer, and said azimuth deflection wave generating circuit including an amplitude limiter for limiting the amplitude of pulses produced by said transducer and means coupled to the output of said amplitude limit for generating a staircase shaped wave, and an output circuit for said barrier-grid storage tube for coupling from said tube only electrical signals corresponding to moving radar targets.

2. A moving target indication radar system comprising, a rotatable directional radar antenna, a radar transmitter, a transducer coupled between said antenna and said transmitter for producing time-spaced keying pulses for said transmitter which are precisely synchronized in time with the instantaneous position and rate of rotation of said antenna, a receiver for receiving radar transmitter energy after radiation from said antenna and reflection by remote wave reflecting objects, a barrier-grid electrical storage tube having an input circuit coupled to the output of said receiver for accepting received reflected radar transmitter energy, azimuth and range deflection wave generating circuits coupled to said transducer for supplying deflection wave signals to said barrier-grid tube, said range deflection wave generating circuit including a pulse rate divider circuit coupled to the output of said transducer and a sawtooth wave deflection circuit responsive to each output pulse from said divider and coupled between said divider and said cathode ray device, and said azimuth deflection wave generating circuit including a peak detector and an integrating circuit successively coupled between the output of said transducer and said cathode ray device, and an output circuit for said barrier-grid storage tube for coupling from said tube only electrical signals corresponding to moving radar targets.

3. A system as claimed in claim 2 wherein said pulse rate divider divides the transducer pulses coupled to said radar transmitter and to said sawtooth wave deflection circuit by a factor of the order of ten.

4. A moving target indication radar system comprising, a rotatable directional radar antenna, a radar transmitter, a transducer coupled between said antenna and said transmitter for producing time-spaced keying pulses for said transmitter which are precisely synchronized in time with the instantaneous position and rate of rotation of said antenna, a receiver for receiving radar transmitter energy after radiation from said antenna and reflection by remote wave reflecting objects, a barrier-grid electrical storage tube having an input circuit connected to the output of said receiver, deflection wave generating means coupled to said transducer for supplying deflection wave signals to said barrier-grid storage tube, and an output circuit for said barrier-grid storage tube for coupling from said tube only electrical signals corresponding to moving radar targets.

References Cited in the file of this patent
UNITED STATES PATENTS

| | | |
|---|---|---|
| 2,405,238 | Seeley | Aug. 6, 1946 |
| 2,500,552 | Lindenblad | Mar. 14, 1950 |
| 2,506,766 | Bartelink | May 9, 1950 |
| 2,513,962 | Patterson | July 4, 1950 |
| 2,698,931 | Voorhis | Jan. 4, 1955 |

OTHER REFERENCES

"Cathode Ray Tube Displays," vol. 22, Radiation Lab. Series, pp. 230–231.